US009884515B2

(12) United States Patent
Ito (10) Patent No.: US 9,884,515 B2
(45) Date of Patent: Feb. 6, 2018

(54) TIRE (71) Applicant: BRIDGESTONE CORPORATION, Chuo-ku, Tokyo (JP)

(72) Inventor: Yuki Ito, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 14/770,466

(22) PCT Filed: Feb. 27, 2014

(86) PCT No.: PCT/JP2014/054962
§ 371 (c)(1),
(2) Date: Aug. 26, 2015

(87) PCT Pub. No.: WO2014/133105
PCT Pub. Date: Sep. 4, 2014

(65) Prior Publication Data
US 2016/0001598 A1 Jan. 7, 2016

(30) Foreign Application Priority Data

Feb. 28, 2013 (JP) ................................ 2013-039750

(51) Int. Cl.
*B60C 1/00* (2006.01)
*B60C 5/01* (2006.01)
(Continued)

(52) U.S. Cl.
CPC .............. *B60C 1/0041* (2013.01); *B60C 1/00* (2013.01); *B60C 5/01* (2013.01); *C08F 255/06* (2013.01);
(Continued)

(58) Field of Classification Search
CPC ........... B60C 5/01; B60C 1/00; B60C 1/0041; B60C 9/14; B60C 2001/005; C08L 77/00;
(Continued)

(56) References Cited

U.S. PATENT DOCUMENTS

2006/0252874 A1   11/2006   Soeda et al.
2008/0058472 A1   3/2008   Soeda et al.
(Continued)

FOREIGN PATENT DOCUMENTS

CN   104245356 A   12/2014
EP   2610072 A1   7/2013
(Continued)

OTHER PUBLICATIONS

European Search Report dated Jan. 25, 2016, issued in corresponding European Patent Application.

*Primary Examiner* — Nicholas E Hill
(74) *Attorney, Agent, or Firm* — SOLARIS Intellectual Property Group, PLLC (57) ABSTRACT

A tire, including a circular tire frame formed of a resin material, the resin material including a resin composition in which at least one thermoplastic resin selected from the group consisting of a polyamide-based thermoplastic resin, a polyester-based thermoplastic resin, and a polyolefin-based thermoplastic resin, and at least one elastomer selected from the group consisting of a diene-based rubber, a vinyl acetate copolymer, a polyurethane, an ethylene propylene rubber, and any modified product thereof have been dynamically crosslinked.

6 Claims, 4 Drawing Sheets (51) Int. Cl.

| | |
|---|---|
| *C08L 23/16* | (2006.01) |
| *C08L 67/00* | (2006.01) |
| *C08L 101/00* | (2006.01) |
| *C08L 51/04* | (2006.01) |
| *C08L 77/02* | (2006.01) |
| *C08F 255/06* | (2006.01) |
| *C08F 279/02* | (2006.01) |
| *C08L 9/00* | (2006.01) |
| *C08L 31/04* | (2006.01) |
| *C08L 75/04* | (2006.01) |
| *C08L 77/00* | (2006.01) |
| *B60C 9/14* | (2006.01) |

(52) U.S. Cl.
CPC .............. *C08F 279/02* (2013.01); *C08L 9/00* (2013.01); *C08L 23/16* (2013.01); *C08L 31/04* (2013.01); *C08L 51/04* (2013.01); *C08L 67/00* (2013.01); *C08L 75/04* (2013.01); *C08L 77/00* (2013.01); *C08L 77/02* (2013.01); *C08L 101/00* (2013.01); *B60C 9/14* (2013.01)

(58) Field of Classification Search
CPC ........ C08L 23/16; C08L 67/00; C08L 101/00; C08L 75/04; C08L 31/04; C08L 9/00; C08L 77/02; C08L 51/04; C08F 279/02; C08F 255/06; C08F 222/06
USPC ........................................................ 152/567
See application file for complete search history.

(56) References Cited

U.S. PATENT DOCUMENTS

| | | | |
|---|---|---|---|
| 2010/0147440 A1* | 6/2010 | Matsunaga | ........ B29D 30/0681 152/564 |
| 2013/0206301 A1 | 8/2013 | Fudemoto et al. | |
| 2015/0020946 A1 | 1/2015 | Fudemoto et al. | |

FOREIGN PATENT DOCUMENTS

| | | | | |
|---|---|---|---|---|
| JP | 2003-104008 A | 4/2003 | | |
| JP | 2004-346137 A | 12/2004 | | |
| JP | 2006-514141 A | 4/2006 | | |
| JP | 2012-046019 A | 3/2012 | | |
| WO | WO 2012026547 A1 * | 3/2012 | ............ | B60C 5/007 |

* cited by examiner

TIRE

TECHNICAL FIELD

The present invention relates to a tire for fitting onto a rim, and in particular to a tire in which at least a portion of a tire case is formed of a resin material.

BACKGROUND ART

Hitherto pneumatic tires configured from rubber, organic fiber materials, steel members, etc. have been employed in vehicles such as cars. Ordinary rubber materials employed in conventional pneumatic tires do not have problems with heat resistance or the like. However, the tire production process normally involves plural processes, such as kneading, seating, molding, and vulcanizing, and improvements to productivity are being demanded.

The use of resin materials, and in particular thermoplastic resins, and thermoplastic elastomers, as tire materials, has, however, recently been investigated from the perspectives of reducing weight, ease of molding, and ease of recycling. For example, pneumatic tires formed using thermoplastic polymer materials are described in Patent Document 1 (JP-A No. 2003-104008) below. Thermoplastic polymer materials (thermoplastic resins) have many advantages from the perspective of raising productivity, such as the capability to be injection molded.

Moreover, there has also been a proposal for a thermoplastic elastomer composition formed including a dynamically crosslinked blend of a halogenated isobutylene elastomer, a polyamide, and an anti-aging agent having a melting point higher than 70° C. and lower than 200° C. (see Patent Document 2 (Japanese National Phase Publication 2006-514141)) as technology enabling a resin to be used for part of a tire (such as for an inner liner).

RELATED DOCUMENTS

Patent Document 1: JP-A No. 2003-104008
Patent Document 2: JP-A No. 2006-514141

SUMMARY OF INVENTION

Technical Problem

Using a thermoplastic resin as described above for a tire material, and in particular for a tire case, enables large improvements to be made in productivity. However, ordinary thermoplastic resins have the property of a drop in rubber elasticity at high temperatures on nearing the molten state. There is accordingly demand for further improvements from the perspective of high temperature permanent deformation properties so that tire properties, which are equivalent to those at room temperature, are maintained in high temperature environments. Moreover, when producing a tire using polymer materials, there is also demand to achieve performance (demanded properties of tire) that is not inferior to that of conventional rubber-made tires, while achieving higher production efficiency and lower costs. For example, an elastic modulus within a specific range and low rolling resistance (excellent low loss property) are the demanded properties of tire. However, in polymer materials there is usually a tradeoff relationship between low loss property and higher elastic modulus. There is accordingly a desire to develop a tire capable of achieving a high level in both these properties.

In the light of the above circumstances, an object of the present invention is to provide a tire that is formed using a resin material, and that has excellent high temperature permanent deformation properties, high elasticity, and excellent low loss property.

Solution to Problem

[1] A tire, including a circular tire frame formed of a resin material, the resin material including a resin composition in which (1) at least one thermoplastic resin selected from the group consisting of a polyamide-based thermoplastic resin, a polyester-based thermoplastic resin, and a polyolefin-based thermoplastic resin, and (2) at least one elastomer selected from the group consisting of a diene-based rubber, a vinyl acetate copolymer, a polyurethane, an ethylene propylene rubber, and any mixture thereof have been dynamically crosslinked.

Advantageous Effects of Invention

The invention enables a tire to be provided that is formed using a resin material, and that has excellent high temperature permanent deformation properties, high elasticity, and excellent low loss property.

DESCRIPTION OF EMBODIMENTS

The tire of the invention includes at least a circular tire frame formed of a resin material, the resin material including a resin composition in which (1) at least one thermoplastic resin selected from the group consisting of a polyamide-based thermoplastic resin, a polyester-based thermoplastic resin, and a polyolefin-based thermoplastic resin (sometimes referred to below as the resin component of the invention); and (2) at least one elastomer selected from the group consisting of a diene-based rubber, a vinyl acetate copolymer, a polyurethane, an ethylene propylene rubber, and any mixture thereof (sometimes referred to below as the elastomer component of the invention) have been dynamically crosslinked.

In the tire of the invention, the tire frame is formed of the resin material including a resin composition in which the resin component of the invention and the elastomer component of the invention have been dynamically crosslinked, and can therefore exhibit an excellent level of high temperature permanent deformation properties. Moreover, productivity is excellent in the tire of the invention since the tire frame can be formed by injection molding due to the tire frame being formed using the resin material. The high temperature permanent deformation properties of the tire of the invention can determined using a measurement value of compression permanent deformation at 100° C. as an indicator, and the higher the value, the better the high temperature permanent deformation properties (the residual strain is small even at high temperatures). Moreover, the tire of the invention can achieve both high elasticity and excellent low loss property by this configuration.

Resin Material

The tire as described above has a tire frame that includes a resin material. The resin material includes at least a resin composition in which the thermoplastic resin of the invention and the elastomer component of the invention have been dynamically crosslinked. In the invention, the "resin material" may include components other than the resin composition, such as additives. In cases in which the resin material does not include components other than the resin composition, the resin material is constituted by the resin composition alone. Moreover, in the present specification, the meaning of "resin" encompasses thermoplastic resins and thermoset resins, but does not encompass natural rubbers.

Resin Composition

The resin composition may be prepared by dynamically crosslinking a thermoplastic resin (the resin component of the invention) and an elastomer (the elastomer component of the invention). Herein, "dynamically crosslinking" refers to a crosslinking process that crosslinks the thermoplastic resin and the elastomer component under a condition of high shear. When the elastomer component and the thermoplastic resin are crosslinked under such a high shear condition, the elastomer component can easily be dispersed as fine particles in the matrix of the thermoplastic resin during crosslinking. The dynamic crosslinking is performed by mixing each component together at the crosslinking temperature of the mixture, or a higher temperature, in a mixer such as a roll mill, a BANBURY MIXER (registered trademark), a continuous mixer, a kneader, or a mixing extruder (for example, a twin screw extruder). The high temperature permanent deformation properties of the resin material can thus be improved by dynamically crosslinking the resin component of the invention and the elastomer component of the invention, thereby enabling a tire to be manufactured that achieves both high elasticity and excellent low loss property.

Thermoplastic Resin (Resin Component of the Invention)

At least one selected from the group consisting of a polyamide-based thermoplastic resin, a polyester-based thermoplastic resin, and a polyolefin-based thermoplastic resin may be employed as the thermoplastic resin of the invention. Of these, polyamide-based thermoplastic resins are particularly preferable as the thermoplastic resin.

Polyamide-Based Thermoplastic Resin

Examples of the polyamide-based thermoplastic resin include polyamides obtained by ring-opening polycondensation of ε-caprolactam (Nylon 6), polyamides obtained by ring-opening polycondensation of undecane lactam (Nylon 11), polyamides obtained by ring-opening polycondensation of lauryl lactam (Nylon 12), polyamides obtained by poly-condensation of a diamine and a dibasic acid (Nylon 66), and polyamides that have metaxylene diamine as a structural unit (Nylon MX). Nylon 46, Nylon 610, Nylon 612, Nylon 6/66 copolymer, Nylon 6/66/610 copolymer, Nylon MXD6, Nylon 6T, Nylon 6/6T copolymer, Nylon 66/PP copolymer, Nylon 66/PPS copolymer, and the like may also be employed therefor.

The Nylon 6 may be represented by, for example, [CO—(CH$_2$)$_5$—NH]$_n$ (where n is the number of repeating units). The amide 11 may be represented by, for example, [CO—(CH$_2$)$_{10}$—NH]$_n$ (where n is the number of repeating units). The amide 12 may be represented by, for example, [CO—(CH$_2$)$_{11}$—NH]$_n$ (where n is the number of repeating units). The Nylon 66 may be represented by, for example, [CO(CH$_2$)$_4$CONH(CH$_2$)$_6$NH]$_n$ (where n is the number of repeating units).

Moreover, the amide MX having meta-xylene diamine as a structural unit may be represented by, for example, the structural unit (A-1) below (where n in (A-1) represents the number of repeating units).

(A-1)

The polyamide-based thermoplastic resin may be a homopolymer constituted by the structural unit alone, or may be a copolymer of the structural unit (A-1) and another monomer. In the case of a copolymer, the content ratio of the structural unit (A-1) in each polyamide-based thermoplastic resin is preferably 60% by mass or above.

The number average molecular weight of the polyamide-based thermoplastic resin is preferably from 300 to 30000. Moreover, from the viewpoint of toughness and flexibility at low temperature, the number average molecular weight of the polymer configuring the soft segment is preferably from 200 to 20000.

A commercial product may be employed as the polyamide-based thermoplastic resin. As the Nylon 6, for example, a commercial product such as "UBE Nylon" 1022B or 1011FB, manufactured by Ube Industries, Ltd., may be used. As the amide 12, "UBE Nylon" 3024U, manufactured by Ube Industries, Ltd., may for example be used. As the Nylon 66, for example "UBE Nylon" may be used. Moreover, as the amide MX, for example, a commercial product, such as MX Nylon (S6001, S6021, or S6011), manufactured by Mitsubishi Gas Chemical Company, Inc. may be used.

The polyamide-based thermoplastic resin preferably has a softening point of less than 275° C., and is particularly preferably a linear crystalline polyamide having a softening point or a melting point of from 160° C. to 230° C. Such polyamide-based thermoplastic resins are described in Kirk-Othmer, Encyclopedia of Polymer Science and Technology, Volume 10, pp. 392-414, and Encyclopedia of Polymer Science and Technology, Volume 10, pp. 392-414. Examples of the Nylon resin having a melting point of from 160° C. to 230° C. include Nylon 6, Nylon 11, Nylon 12, Nylon 6/66 copolymer, Nylon 610, and Nylon 612. In cases in which the melting point of the Nylon resin is less than 160° C., the resin composition may melt and become more difficult to handle in some cases, such as during the dynamic cross-linking. In cases in which the melting point exceeds 230° C., the Young's modulus of the resin composition becomes overly large in some cases.

Polyester-Based Thermoplastic Resin

The polyester-based thermoplastic resin is a resin having ester bonds in the main chain thereof.

The polyester-based thermoplastic resin is not particularly limited, and may be crystalline, or amorphous, and examples thereof include aliphatic-type polyesters, and aromatic-type polyesters. The aliphatic-type polyester may be a saturated aliphatic-type polyester, or an unsaturated aliphatic-type polyester.

Aromatic polyesters are generally crystalline, and can be formed from, for example, an aromatic dicarboxylic acid or an ester-forming derivative thereof, and an aliphatic diol.

Examples of the aromatic polyester include aromatic polyesters such as polybutylene terephthalate, polyethylene terephthalate, polyethylene isophthalate, polybutylene terephthalate/tetramethylene glycol copolymers, polyethylene terephthalate/polyethylene isophthalate copolymers, polyarylate, polybutylene naphthalate, liquid crystal polyesters, and polyoxyalkylene diimidic acid/polybutylene terephthalate copolymers.

As described above, one of the aromatic polyester may be polybutylene terephthalate derived from terephthalic acid and/or dimethylterephthalate, and 1,4-butanediol; moreover, it may be a polyester derived from a dicarboxylic acid component such as isophthalic acid, phthalic acid, naphthalene-2,6-dicarboxylic acid, naphthalene-2,7-dicarboxylic acid, diphenyl-4,4'-dicarboxylic acid, diphenoxyethane dicarboxylic acid, 5-sulfoisophthalic acid, or ester forming derivatives thereof, and a diol with a molecular weight of 300 or less (for example, an aliphatic diol such as ethylene glycol, trimethylene glycol, pentamethylene glycol, hexamethylene glycol, neopentyl glycol, or decamethylene glycol, an alicyclic diol such as 1,4-cyclohexane dimethanol, or tricyclodecane dimethylol, or an aromatic diol such as xylylene glycol, bis(p-hydroxy)diphenyl, bis(p-hydroxyphenyl)propane, 2,2-bis[4-(2-hydroxyethoxyl)phenyl]propane, bis[4-(2-hydroxyl)phenyl]sulfone, 1,1-bis[4-(2-hydroxyethoxyl)phenyl]cyclohexane, 4,4'-dihydroxy-p-terphenyl, or 4,4'-dihydroxy-p-quaterphenyl) or the like, or a copolymer polyester including two or more of these dicarboxylic acid components and diol components in a combination. Copolymerization can also be made with a polyfunctional carboxylic acid component having three or more functional groups, a polyfunctional oxyacid component, or a polyfunctional hydroxy component in a range of 5% by mol or less.

As the polyester-based thermoplastic resin, a commercial product may be used, with examples including the "DURANEX" series (examples include 2000, and 2002), manufactured by Polyplastics Co., Ltd., the NOVADURAN series (examples include 5010R5, and 5010R3-2), manufactured by Mitsubishi Engineering-Plastics Corporation, and the "TORAYCON" series (examples include 1401X06, and 1401X31), manufactured by Toray Industries, Inc.

The aliphatic polyester may be any of a dicarboxylic acid/diol condensate, or a hydroxycarboxylic acid condensate. Examples thereof include polylactic acid, polyhydroxy-3-butyl butyric acid, polyhydroxy-3-hexylbutyric acid, poly($\epsilon$-caprolactone), polyenantholactone, polycaprylolactone, polybutylene adipate, and polyethylene adipate.

The vicat softening temperature of the thermoplastic resin material that includes the polyester-based thermoplastic resin, as defined by JIS K7206 (method A), is preferably 130° C. or above, is preferably from 130° C. to 250° C., and is more preferably from 130° C. to 220° C. In cases in which the softening temperature of the thermoplastic resin material (according to method A) is 130° C. or above, the tire can be suppressed from softening or deforming in the usage environment. Moreover, deformation of the tire frame can be suppressed in even in cases in which the vulcanization is performed in joining of the tire manufacture.

Polyolefin-Based Thermoplastic Resin

Examples of the polyolefin-based thermoplastic resin include homopolymers, random copolymers, and block copolymers of $\alpha$-olefins such as propylene or ethylene, and of cyclic olefins such as cycloolefins. Specific examples thereof include polyethylene-based thermoplastic resins, polypropylene-based thermoplastic resins, and polybutadiene-based thermoplastic resins, with polypropylene-based thermoplastic resins in particular being preferable from the viewpoints of heat resistance, and workability.

Specific examples of the polypropylene-based thermoplastic resin include propylene homopolymers, propylene-$\alpha$-olefin random copolymers, and propylene-$\alpha$-olefin block copolymers. Examples of such $\alpha$-olefins include $\alpha$-olefins having approximately from 3 to 20 carbon atoms, such as propylene, 1-butene, 1-pentene, 3-methyl-1-butene, 1-hexene, 4-methyl-1-pentene, 3-methyl-1-pentene, 1-heptene, 1-octene, 1-decene, 1-dodecene, 1-tetradecene, 1-hexadecene, 1-octadecene, and 1-eicosene.

Note that the polyolefin-based thermoplastic resin may be a chlorinated polyolefin-based resin in which some or all of the hydrogen atoms in the molecule are substituted by chlorine atoms. Examples of the chlorinated polyolefin-based resin include chlorinated polyethylene-based resins.

The melting point of the polyolefin-based thermoplastic resin is generally from 80° C. to 200° C., and from the viewpoint of tire productivity, is preferably from 100° C. to 200° C. Employing a thermoplastic resin material that includes a polyolefin-based thermoplastic resin having a melting point of from 100° C. to 200° C. in this manner, enables the heating temperature of the joint portion to be set at the melting point of the thermoplastic resin material that forms the tire frame or higher when, for example, forming the tire frame by welding the divided halves (the frame pieces) thereof together.

Employing a thermoplastic resin material that includes a polyolefin-based thermoplastic resin in the tire of the invention enables tire frame pieces to be adhered together more strongly, even when the tire frame is welded in a temperature range of from 100° C. to 200° C., and enables durability properties such as puncture resistance and abrasion resistance during running to be improved. Note that the heating temperature is preferably a temperature that is from 10° C. to 150° C. higher, and is more preferably a temperature that is from 10° C. to 100° C. higher, than the melting point of the thermoplastic resin material including the polyolefin-based thermoplastic elastomer that forms the tire frame pieces.

Elastomer Component of the Invention

Examples of the elastomer component of the invention that is dynamically crosslinked with the thermoplastic resin of the invention include diene-based rubbers, vinyl acetate copolymers, polyurethanes, ethylene propylene rubbers, and mixtures thereof. Examples of the elastomer component of the invention include modified products of the diene-based rubbers, the vinyl acetate copolymers, the polyurethane, and the ethylene propylene rubber. Examples of the diene-based rubber include diene-based rubbers and hydrogenated products thereof (for example, natural rubbers, isoprene rubbers, epoxidized natural rubbers, styrene butadiene rubbers, butadiene rubbers (high-cis BR and low-cis BR), acrylonitrile butadiene rubbers, hydrogenated acrylonitrile butadiene rubbers, and hydrogenated styrene butadiene rubbers), and modified products of diene-based rubbers. Note that the diene-based rubbers do not include butyl rubbers (IIR). The diene-based rubber is preferably a styrene butadiene rubber, a carboxyl group-containing styrene butadiene rubber such as a maleic acid modified styrene butadiene rubber, an emulsion polymerized styrene butadiene rubber, a butadiene rubber, an isoprene rubber, or a natural rubber. Examples of the vinyl acetate copolymer include ethylene vinyl acetate copolymers (for example, the "ULTRASEN" series manufactured by TOSOH CORPORATION), and modified products thereof.

The ethylene propylene rubbers include ethylene-propylene-diene compound rubbery copolymers (EPDM), and ethylene-propylene rubbery copolymers (EPM), and modified products thereof (such as maleic acid modified ethylene propylene rubber). EPDM and EPM have melting properties close to those of resins, and have vulcanization sites with double bonds, and are therefore well suited when performing sulfur crosslinking Examples of the modified ethylene propylene rubber include maleic acid modified EPDM. Acid modification increases affinity for basic polyamides, and facilitates fine dispersion. Maleic acid modified EPDM can be obtained by treating EPDM with maleic anhydride.

A polyurethane-based thermoplastic elastomer may be employed as the polyurethane. Examples of the polyurethane-based thermoplastic elastomer include materials with at least a polyurethane constituting a hard segment that forms pseudo-crosslinks by physical aggregation, and another polymer constituting a soft segment that is amorphous and has a low glass transition temperature.

From the viewpoint of melt moldability, the number average molecular weight of the polymer (polyurethane) constituting the hard segment is preferably from 300 to 1500. Moreover, from the viewpoints of flexibility and thermal stability of the polyurethane-based thermoplastic elastomer, the number average molecular weight of the polymer constituting the soft segment is preferably from 500 to 20000, more preferably from 500 to 5000, and particularly preferably from 500 to 3000. Moreover, from the viewpoint of moldability, the mass ratio (x:y) of the hard segment (x) to the soft segment (y) is preferably from 15:85 to 90:10, and more preferably from 30:70 to 90:10.

The polyurethane-based thermoplastic elastomer may be synthesized by a known method to copolymerize a polymer constituting a hard segment, and a polymer constituting a soft segment. The thermoplastic polyurethane described in JP-A H05-331256, for example, may be employed as the polyurethane-based thermoplastic elastomer.

Specifically, the polyurethane-based thermoplastic elastomer is preferably a combination of a hard segment including an aromatic diol, and an aromatic diisocyanate, and a soft segment including a polycarbonate ester, with a tolylene diisocyanate (TDI)/polyester-based polyol copolymer, a TDI/polyether-based polyol copolymer, a TDI/caprolactone-based polyol copolymer, a TDI/polycarbonate-based polyol copolymer, a 4,4'-diphenylmethane diisocyanate (MDI)/polyester-based polyol copolymer, an MDI/polyether-based polyol copolymer, an MDI/caprolactone-based polyol copolymer, an MDI/polycarbonate-based polyol copolymer, or an MDI+hydroquinone/polyhexamethylene carbonate copolymer being preferable, and a TDI/polyester-based polyol copolymer, a TDI/polyether-based polyol copolymer, an MDI/polyester polyol copolymer, an MDI/polyether-based polyol copolymer, or an MDI+hydroquinone/polyhexamethylene carbonate copolymer being more preferable.

Moreover, examples of commercial products that may be employed as the polyurethane-based thermoplastic elastomer include the "ELASTOLLAN" series (examples include ET680, ET880, ET690, and ET890), manufactured by BASF SE, the "KURAMIRON U" series (for example, 2000 series, 3000 series, 8000 series, and 9000 series), manufactured by Kuraray Co., Ltd., and the "MIRACTRAN" series (for example, XN-2001, XN-2004, P390RSUP, P480RSUI, P26MRNAT, E490, E590, and P890), manufactured by Nippon Miractran Co., Ltd.

The elastomer component of the invention is preferably an ethylene propylene rubber, and is more preferably maleic acid modified EPDM. In particular, the combination of the resin component of the invention and the elastomer component of the invention is preferably a combination of the amide-based thermoplastic resin and the ethylene propylene rubber, and is more preferably a combination of the amide-based thermoplastic resin and maleic acid modified EPDM. The elastomer component may be employed singly, or may be employed as a mixture combining elastomer components. In particular, the diene-based rubber component may be employed in a desired combination, and examples of such combinations include a combination of emulsion polymerized SBR and isoprene rubber, a combination of a carboxyl group-containing SBR and isoprene rubber, a combination of EPDM and maleic acid modified EPDM, a combination of natural rubber and isoprene rubber, and a combination of isoprene rubber and EPDM.

Other Additives

In cases in which the polyamide-based thermoplastic resin is employed as the thermoplastic resin, a polymer having affinity for the polyamide-based thermoplastic resin can be used in combination therewith. A polymer for modification having a functional group that is reactive toward the polyamide resin, or another thermoplastic resin may be employed as a polymer having affinity for the polyamide-based thermoplastic resin.

Examples of the polymer for modification having a functional group that is reactive toward the polyamide resin include the polymer for modification described in Japanese National-Phase Publication No. 2010-516835.

In cases in which, for example, a polyamide-based thermoplastic resin such as Nylon 6, Nylon 66, Nylon 6.66, Nylon 612, Nylon 11, Nylon 12, Nylon 46, Nylon 6•66•610, or Nylon MXD6 is employed as the thermoplastic resin, examples of functional groups that are reactive toward these polyamide-based thermoplastic resins include acid anhydride groups, epoxy groups, halogen groups, carboxyl groups, amino groups, hydroxyl groups, and other function groups, and acid anhydride groups such as a maleic acid anhydride group are preferable. A polymer that has a functional group that has such reactivity may be employed as the polymer for modification.

Examples of the polymer for modification having an anhydride group include homopolymers and copolymers of olefins. A copolymer of ethylene and at least one α-olefin selected from out of propylene, butene, hexene, and octene is particularly preferable from the viewpoint of elongation at break and ultimate tensile strength.

In cases in which the polyamide-based thermoplastic resin is employed, the polymer for modification preferably has a tensile stress at break of from 30% to 70% of that of the polyamide resin, and a tensile elongation at break of from 100% to 500% of that of the polyamide resin (both as measured at −20° C. according to JIS K6251).

A compatibilizing agent for the thermoplastic resin and the elastomer component of the invention may also be employed in the resin material. The compatibilizing agent may operate so as to make surface energies closer between layers, and may have a reactive functional group. A carbonyl group, a halogen group, a hydroxyl group, an amino group, an epoxy group, or the like is well suited to employment as the reactive group. Main examples of the compatibilizing agent include maleic acid modified polyolefins, polymers obtained by graft polymerization of acrylic acid or glycidyl methacrylate onto a polyolefin, block copolymers of polyolefins and Nylons, and maleic acid modified products of styrene-ethylene-butadiene-styrene copolymers.

Various additives, such as rubbers, various fillers (for example, silica, calcium carbonate, or clays), anti-aging agents, oils, plasticizers, coloring agents, weather proofing agents, or reinforcing materials, may be included in the resin material if desired. The content of the additives in the resin material (tire frame) is not particularly limited, and they may be used as appropriate within a range that does not impair the advantageous effects of the invention. In cases in which components other than resin, such as additives, are added to the resin material, the content of the resin component in the resin material is preferably 50% by mass or greater, and is more preferably 90% by mass or greater, with respect to the total amount of resin material. Note that the content of the resin component in the resin material is the remaining portion after subtracting the total content of each additive from the total amount of the resin component.

Examples of the anti-aging agent include the anti-aging agents described by International Publication (WO) 2005/063482. Specific examples thereof include amine-based anti-aging agents such as: naphthylamine-based anti-aging agents such as phenyl-2-naphthylamine or phenyl-1-naphthylamine; diphenylamine-based anti-aging agents such as (4,4'-α,α-dimethylbenzyl)diphenylamine or p-(P-toluene/sulfonyl amide)-diphenylamine; or p-phenylene diamine-based anti-aging agents such as N,N'-diphenyl-p-phenylene diamine or N-isopropyl-N'-phenyl-p-phenylene diamine, and derivatives and mixtures thereof.

Moreover, an anti-aging agent of a triphosphite anti-aging agent or a hindered phenol anti-aging agent, singularly or in a combination with another anti-aging agent, can be employed preferably at 5 phr (namely, parts by mass per hundred parts by mass of rubber) or less, more preferably at 4 phr or less, still more preferably at 3 phr or less, yet still more preferably at 2 phr or less, and most preferably at 1 phr or less. Typical examples of the triphosphite anti-aging agent include tris(di-tert-butylphenyl)phosphite or tris-nonylphenyl phosphite, and typical examples of the hindered phenol anti-aging agent include 4,4'-butylidene bis-(3-methyl-6-tert-butylphenol) or 2,4-bis[(octylthio)methyl]-o-cresol.

Dynamic Crosslinking

As described above, the resin composition is prepared by dynamically crosslinking the thermoplastic resin of the invention and the elastomer of the invention.

The compounding ratio of thermoplastic resin (the resin component) and the elastomer (the elastomer component) of the invention in the resin composition is such that a content of the thermoplastic resin is preferably from 40 to 500 parts by mass, and more preferably from 50 to 450 parts by mass, with respect to 100 parts by mass of the total amount of the elastomer. When the compounding ratio of the thermoplastic resin and the elastomer is within the above range, a so-called sea-island structure is easily formed in which the elastomer component of the invention forms an island phase (also called as a non-continuous phase, a dispersed layer, or a domain) with respect to a sea phase (also called as a continuous phase or a matrix phase) that includes the thermoplastic resin (the resin component).

The fine dispersion of island phase that includes the elastomer component of the invention in the sea phase that includes the thermoplastic resin can be confirmed by inspecting images obtained by an SEM (scanning electron microscope). The size of the island phase that includes the elastomer component of the invention (the island phase diameter) is preferably from approximately 0.4 μm to approximately 10.0 μm, is more preferably from approximately 0.5 μm to approximately 7 μm, and is particularly preferably from approximately 0.5 μm to approximately 5 μm. Each of these phase sizes can be measured by inspecting images obtained by an SEM.

In the dynamic crosslinking process, first, the elastomer and a specific crosslinking agent are pre-kneaded until a uniformly mixed state is obtained using a standard kneader, a BANBURY MIXER, or the like. In such cases, an appropriate amount of a filler such as carbon, an oil, or calcium carbonate may be added to the elastomer component. The kneading is preferably performed with the temperature suppressed to a low temperature of 120° C. or less, since the rubber component may undergo crosslinking reactions in the kneading machine if the material temperature is too high during kneading.

Next, the crosslinking agent-containing elastomer component obtained above and the thermoplastic resin (the resin component) are input to a twin screw kneader or the like, the rubber component is caused to dynamically crosslink while performing melting and kneading, and the elastomer component is caused to disperse as a dispersed phase (domain) in the thermoplastic resin that constitutes a continuous phase (matrix phase). Additives (not including the vulcanizing agent described below) to be added to the thermoplastic resin or the elastomer may be added during the kneading, or may be mixed in advance before kneading.

The kneading machine employed in the kneading is not particularly limited, and a screw extruder, a kneader, a BANBURY MIXER, a twin screw extruder, or the like may be employed. Of these, a twin screw extruder is preferably employed in the kneading and dynamic crosslinking of the thermoplastic resin and the elastomer. Moreover, plural kneading machines may be employed, and successive kneading may be performed. Regarding the melting and kneading conditions, it is sufficient that the temperature is a temperature at which the specific Nylon resin melts or greater. Moreover, the shear rate during kneading is preferably from 500 $s^{-1}$ to 7500 $s^{-1}$. The overall kneading time is preferably from approximately 30 seconds to approximately 10 minutes.

The resin composition obtained above has a so-called sea-island structure in which the elastomer that forms the discontinuous phase is dispersed as a dispersed phase (domain) in the matrix of the thermoplastic resin that forms the continuous phase. Adoption of such a dispersed structure enables heat resistance and high temperature permanent deformation properties of the resin composition to be improved. Note that vulcanization agents (crosslinking agents), vulcanization accelerators, vulcanization conditions (temperature and time), and the like are not particularly limited, and may be appropriately determined according to the composition of the elastomer being added to, in cases in which dynamic vulcanization is performed.

Next, an ordinary rubber vulcanizing agent (crosslinking agent) may be employed as a crosslinking agent (vulcanization agent) employed in dynamic crosslinking More specifically, examples of sulfur-based vulcanization agents include powdered sulfur, precipitated sulfur, highly dispersed sulfur, surface treated sulfur, insoluble sulfur, dimorpholine disulfide, and alkylphenol disulfide, and, for example, these may be employed at from approximately 0.5 phr to approximately 4 phr (parts by mass per hundred parts by mass of elastomer component). Examples of organic peroxide-based vulcanization agents include benzoyl peroxide, t-butyl hydroperoxide, 2,4-bichlorobenzoyl peroxide, 2,5-dimethyl-2,5-di(t-butylperoxy)hexane, and 2,5-dimethyl hexane-2,5-di(peroxybenzoate), and these may, for example, be employed at from approximately 1 phr to approximately 20 phr. Moreover, examples of phenol resin-based vulcanization agents include mixed crosslink-based vulcanization agents that contain a halogen donor such as a brominated alkylphenol resin, tin chloride, or chloroprene, and an alkylphenol resin, and these may, for example, be employed at from approximately 1 phr to approximately 20 phr. Other examples include flowers of zinc (at approximately 5 phr), magnesium oxide (at approximately 4 phr), litharge (at from approximately 10 phr to approximately 20 phr), p-quinone dioxime, p-dibenzoylquinone dioxime, tetrachloro-p-benzoquinone, poly-p-dinitrosobenzene (at from approximately 2 phr to approximately 10 phr), and methylene dianiline (at from approximately 0.2 phr to approximately 10 phr). A vulcanization accelerator may be added to the vulcanization agent if necessary. An ordinary vulcanization accelerator such as a vulcanization accelerator that is aldehyde/ammonia-based, guanidine-based, thiazole-based, sulfenamide-based, thiuram-based, dithioate-based, or thiourea-based, may be employed as the vulcanization accelerator at from approximately 0.5 phr to approximately 2 phr.

Physical Properties of Resin Material

Explanation next follows regarding preferable physical properties of the resin material that configures the tire frame. In the invention, the tire frame includes the resin material described above.

The melting point (or softening point) of resin material (tire frame) itself is normally from 100° C. to 350° C., and is preferably from 100° C. to 250° C.; however, from 120° C. to 250° C. is preferable, and from 120° C. to 200° C. is more preferable, from the viewpoint of productivity of the tire.

The use of the resin material having a melting point of from 120° C. to 250° C. results in sufficient welding strength between tire frame pieces when, for example, forming the tire frame by welding the divided halves (the frame pieces) thereof together, even when the tire frame is welded in a surrounding temperature range of from 120° C. to 250° C. Durability properties such as puncture resistance and abrasion resistance during running are therefore excellent in the tire of the invention. Note that the heating temperature is preferably a temperature that is from 10° C. to 150° C. higher, and is more preferably a temperature that is from 10° C. to 100° C. higher, than the melting point (or softening point) of resin material included in the tire frame pieces.

The resin material may include various additives, if necessary, and may be obtained by appropriate mixing with a known method (for example, melt mixing).

Resin material obtained by melt mixing may be employed in pellet form, if necessary.

The tensile yield strength, as defined by JIS K7113:1995, of the resin material (tire frame) itself is preferably 5 MPa or greater, is preferably from 5 MPa to 20 MPa, and is more preferably from 5 MPa to 17 MPa. Setting the tensile yield strength of the resin material at 5 MPa or greater makes it possible to withstand deformation due to the loads imparted to the tire during running or the like.

The tensile yield elongation, as defined by JIS K7113:1995, of the resin material (tire frame) itself, is preferably 10% or greater, is preferably from 10% to 70%, and is more preferably from 15% to 60%. Setting the tensile yield elongation of the resin material to 10% or greater enables a large elastic region and good fittability onto a rim to be achieved.

The tensile breaking elongation, as defined by JIS K7113:1995, of the resin material (tire frame) itself is preferably 50% or greater, is preferably 100% or greater, is more preferably 150% or greater, and is particularly preferably 200% or greater. Setting the tensile breaking elongation of the resin material to 50% or greater enables good fittability onto a rim to be achieved, and enables low susceptibility to impact damage.

The deflection temperature under load (at 0.45 MPa load), as defined by ISO75-2 or ASTM D648, of the resin material (tire frame) itself is preferably 50° C. or above, is preferably from 50° C. to 150° C., and is more preferably from 50° C. to 130° C. Setting the deflection temperature under load of the resin material at 50° C. or above enables deformation of the tire frame to be suppressed even in cases in which vulcanization is performed during manufacture of the tire.

First Embodiment

Explanation follows regarding a tire according to a first embodiment of a tire of the invention, with reference to the drawings.

Figure 1A:
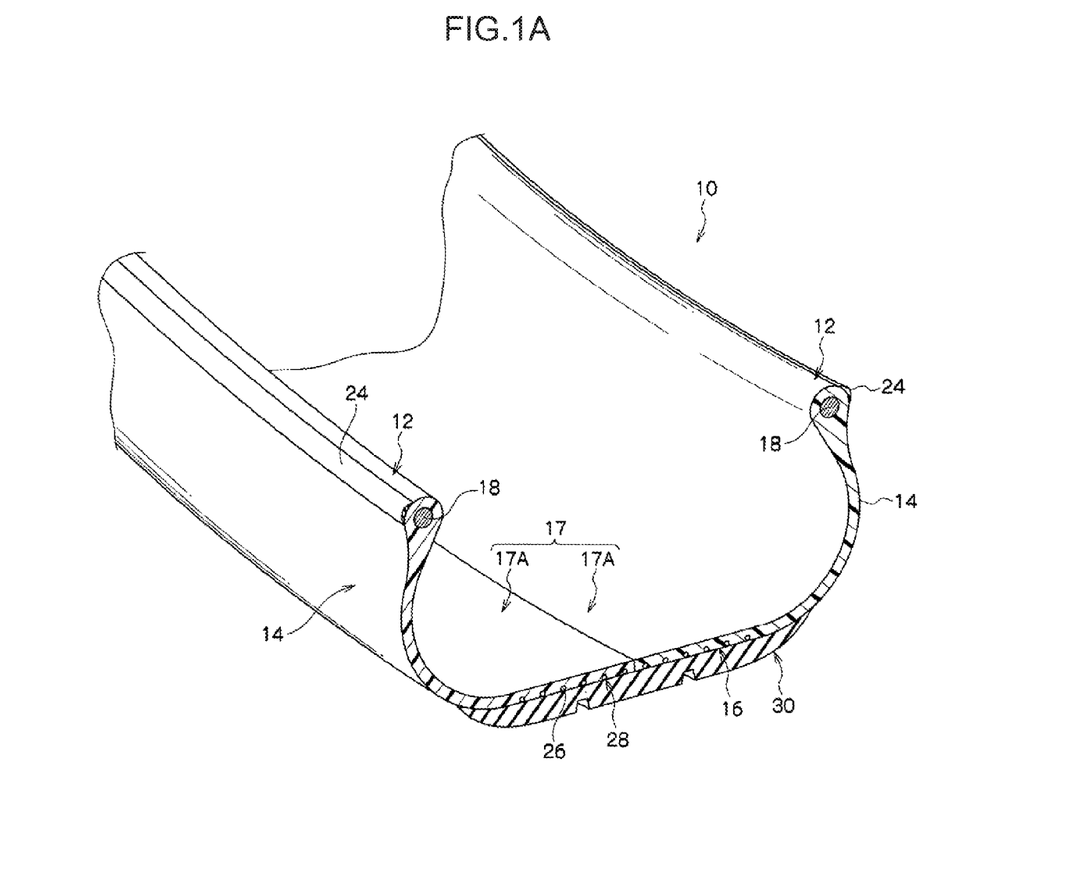
FIG. 1A is a perspective view illustrating a cross-section of a portion of a tire according to an embodiment of the invention.
Figure 1B:
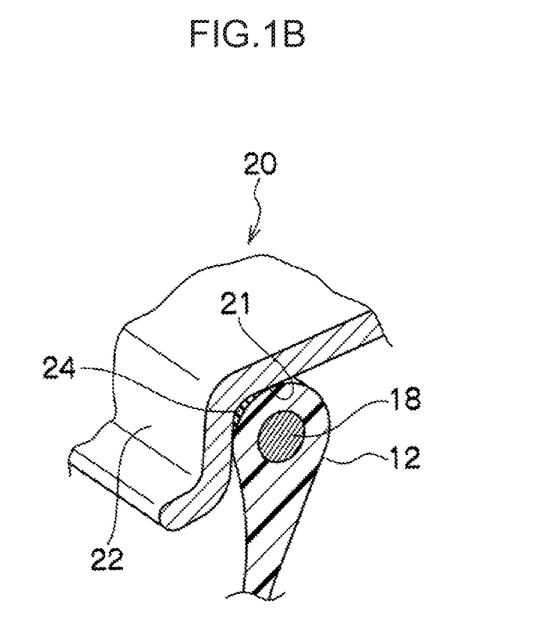
FIG. 1B is a cross-section of a bead portion fitted onto a rim.

Explanation follows regarding a tire 10 of the present embodiment. FIG. 1A is a perspective view illustrating a partial cross-section of a tire according to an embodiment of the invention. FIG. 1B is a cross-section of a bead portion fitted onto a rim. As illustrated in FIG. 1A, the tire 10 of the present embodiment exhibits a substantially similar cross-section profile to that of a conventional rubber-made pneumatic tire.

As illustrated in FIG. 1A, the tire 10 is equipped with a tire case 17 configured including a pair of bead portions 12 that each make contact with a bead seat 21 and a rim flange 22 of the rim 20 illustrated in FIG. 1B, side portions 14 that respectively extend from the bead portions 12 toward the tire radial direction outside, and a crown portion 16 (outer peripheral portion) that connects together the tire radial direction outside end of one side portion 14 and the tire radial direction outside end of the other side portion 14.

Examples of resin materials employable in the tire case 17 of the present embodiment include a resin composition including Nylon 6 (a resin component of the invention) and maleic acid modified EPDM (an elastomer component of the invention) contained at a ratio of 2:1, and various additives, in which the elastomer component is dynamically cross-linked.

The tire case 17 of the present embodiment is formed with a single resin material; however, the configuration of the invention is not limited thereto, and similarly to ordinary conventional rubber-made pneumatic tires, thermoplastic resin materials with different properties may be employed for each of the portions of the tire case 17 (such as the side portions 14, the crown portion 16 and the bead portions 12). The tire case 17 may be reinforced by a reinforcing material by embedding the reinforcing material (such as fibers, cord, nonwoven fabric, or woven fabric of a polymer material or metal) in the tire case 17 (for example, in the bead portions 12, the side portions 14, the crown portion 16, and the like).

In the invention, the tire frame of the invention is formed by a single resin material; however, the tire frame may be configured with a combination of plural materials for the crown portion, the side portions, etc. of the tire frame of the invention. In such cases, the tire frame of the invention is preferably configured using the resin material of the invention at least in the side portions. In particular, employing the resin material of the invention in at least the side portions of the tire frame enables a tire to be provided that has a satisfactory high elastic modulus, and a satisfactory low loss property.

In such cases, the thickness of the crown portion of the tire frame may be appropriately selected to adjust the bending elastic modulus; however, in consideration of the tire weight and the like, the thickness is preferably from 0.5 mm to 10 mm, more preferably from 1 mm to 5 mm, and particularly preferably from 1 mm to 4 mm. Similarly, the thickness of the side portions of the tire frame is more preferably from 0.5 mm to 10 mm, and particularly preferably from 1 mm to 5 mm. The thickness of the crown portion and the side portions of the tire frame may be taken with reference to the average thickness of test samples during bending elastic modulus measurement. The thickness of the tire frame may be appropriately measured by employing a known method and device.

In the tire case 17 of the present embodiment, a pair of tire case halves (tire frame pieces) 17A formed of a resin material are joined together. The tire case halves 17A are each formed as a single body of one of the bead portions 12, one of the side portions 14, and half the width of the crown portion 16, by injection molding or the like, to give tire case halves 17A of the same circular ring shape that are then aligned to face each other and joined together at tire equatorial plane portions. Note that the tire case 17 is not limited to that formed by joining two members, and may be formed by joining three or more members.

The tire case halves 17A formed with the resin material may, for example, be molded by vacuum molding, pressure molding, injection molding, melt casting, or the like. The need to perform vulcanization is therefore eliminated in contrast to conventional cases in which a tire case is formed from rubber, enabling tire production processes to be greatly simplified, and enabling molding time to be reduced.

In the present embodiment, the tire case halves 17A are formed in left-right symmetrical shapes, namely one of the tire case halves 17A is formed in the same shape as the other of the tire case halves 17A, with the advantage that one type of mold suffices for forming the tire case halves 17A In the present embodiment, as illustrated in FIG. 1B, a circular ring shaped bead core 18, formed of steel cord, is embedded in each of the bead portions 12, similarly to in ordinary conventional pneumatic tires. However, the invention is not limited to such a configuration, and the bead core 18 may be omitted as long as the rigidity of the bead portions 12 is secured, and there are no issues with fitting to the rim 20. Other than steel cord, the bead core 18 may also be formed of, for example, organic fiber cord, organic fiber cord covered in a resin, or a hard resin.

In the present embodiment, a seal layer 24 formed in a circular ring shape from a material with better sealing properties than the resin material forming the tire case 17, for example rubber, is formed at portions of the bead portions 12 that contact the rim 20, and at least at portions that contact the rim flanges 22 of the rim 20. The seal layer 24 may also be formed to portions where the tire case 17 (the bead portions 12) and the bead seats 21 contact each other. A softer material than the resin material forming the tire case 17 may be employed as the material with better sealing properties than the resin material forming the tire case 17. As a rubber capable of being employed as the seal layer 24, preferably the same type of rubber is employed as the rubber employed on bead portion external faces of ordinary conventional rubber-made pneumatic tires. The rubber seal layer 24 may also be omitted as long as sealing properties with the rim 20 can be secured with the resin material forming the tire case 17 alone, or another thermoplastic resin (thermoplastic elastomer) with better sealing properties than the resin material may also be employed. Examples of such other thermoplastic resins include resins such as polyurethane-based resins, polyolefin-based resins, polystyrene-based thermoplastic resins, polyester resins, and blends of these resins and a rubber or elastomer, or the like. A thermoplastic elastomer may also be employed, and examples include polyester-based thermoplastic elastomers, polyurethane-based thermoplastic elastomers, polystyrene-based thermoplastic elastomers, polyolefin-based thermoplastic elastomers, a combination of such elastomers with each other, or blends with rubber, and the like.

As illustrated in FIG. 1A, a reinforcing cord 26 having higher rigidity than the resin material forming the tire case 17 is wound onto the crown portion 16 in the tire case 17 circumferential direction. The reinforcing cord 26 is wound in a spiral shape, such that at least a portion thereof is in an embedded state in the crown portion 16 in cross-section taken along the tire case 17 axial direction, to form a reinforcing cord layer 28. The crown 30, formed of a material, such as rubber, having better abrasion resistance than the resin material forming the tire case 17, is disposed to the tire radial direction outer peripheral side of the reinforcing cord layer 28.

Figure 2:
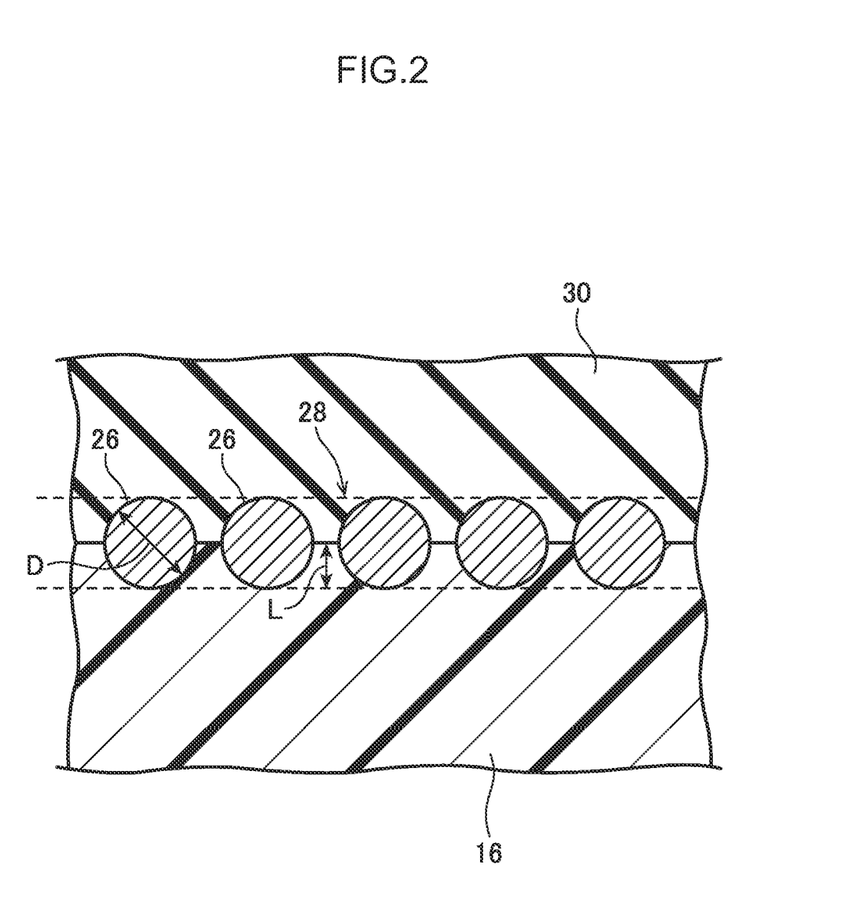
FIG. 2 is a cross-section taken along the rotation axis of a tire, and illustrating a state in which a reinforcing cord is embedded in a crown portion of a tire case of a tire of a first embodiment.

Explanation follows regarding the reinforcing cord layer 28 formed by the reinforcing cord 26, with reference to FIG. 2. FIG. 2 is a cross-section taken along the tire rotation axis and illustrating a state in which reinforcing cord is embedded in the crown portion of a tire case of a tire of the first embodiment. As illustrated in FIG. 2, the reinforcing cord 26 is wound in a spiral shape such that, in cross-section taken along the tire case 17 axial direction, at least a portion is embedded in the crown portion 16, to form, together with a portion of the outer peripheral portion of the tire case 17, a reinforcing cord layer 28 as illustrated by the intermittent line portion in FIG. 2. The portion of the reinforcing cord 26 embedded in the crown portion 16 is in a close contact state with the resin material forming the crown portion 16 (the tire case 17). A monofilament (single strand) such as of metal fiber or organic fiber, or a multifilament (twisted strands) formed of twisted fibers such as a steel cord formed of twisted steel fiber, or the like may be employed as the reinforcing cord 26. In the present embodiment, a steel cord is employed as the reinforcing cord 26.

The embedded amount L in FIG. 2 illustrates an embedded amount of the reinforcing cord 26 with respect to the tire case 17 (the crown portion 16) toward the tire rotation axis direction. The embedded amount L of the reinforcing cord 26 with respect to the crown portion 16 is preferably ⅕ of the diameter D of the reinforcing cord 26, or greater, and more preferably exceeds ½ thereof. It is most preferable for the whole of the reinforcing cord 26 to be embedded in the crown portion 16. From a dimensional perspective of the reinforcing cord 26, setting the embedded amount L to exceed ½ the diameter D of the reinforcing cord 26 makes it difficult for the reinforcing cord 26 to come away from the embedded portion. Embedding the whole of the reinforcing cord 26 in the crown portion 16 gives a flat surface (outer peripheral face), and enables air to be suppressed from being trapped at the reinforcing cord peripheral portion even when a member is placed on the crown portion 16 embedded with the reinforcing cord 26. The reinforcing cord layer 28 corresponds to a belt disposed on the outer peripheral face of a carcass of a conventional rubber-made pneumatic tire.

As described above, the crown 30 is disposed at the tire radial direction outer peripheral side of the reinforcing cord layer 28. The rubber employed in the crown 30 is preferably a similar type of rubber to the rubber employed in a conventional rubber-made pneumatic tire. In place of the crown 30, a crown formed of another type of resin material with better abrasion resistance than the resin material forming the tire case 17 may be employed. The crown 30 is formed with a crown pattern formed of plural grooves in the road contact face, similarly to in a conventional rubber-made pneumatic tire. Explanation follows regarding a production method of a tire according to the present embodiment.

Tire Case Molding Process

First tire case halves are molded using the resin material as described above containing a resin composition in which Nylon 6 and maleic acid modified EPDM have been dynamically crosslinked. The molding of the tire case is preferably performed by injection molding. Then, tire case halves supported by a thin metal support ring are aligned to face each other. Then placement of a jointing mold, not illustrated in the drawings, is made such that outer peripheral faces of the abutting portions of the tire case halves make contact. The jointing mold is configured to press the periphery of the joining portion (the abutting portion) of the tire case halves 17A with a specific pressure. Then the periphery of the joining portion of the tire case halves is pressed at the melting point (or softening point) of the resin material forming the tire case, or higher. The joining portion of the tire case halves is heated and pressed by the jointing mold, melting the joining portion, welding the tire case halves together, and forming these members into a single body of the tire case 17. Note that although in the present embodiment the joining portion of the tire case halves is heated by using the jointing mold, the invention is not limited thereto, and, for example, the joining portions may be heated by a separately provided radio frequency heater, or the like, or may be pre-softened or melted by using hot air, irradiation with infrared radiation, or the like, and then pressed by the jointing mold. The tire case halves may thus be joined together.

Reinforcing Cord Member Winding Process

Figure 3:
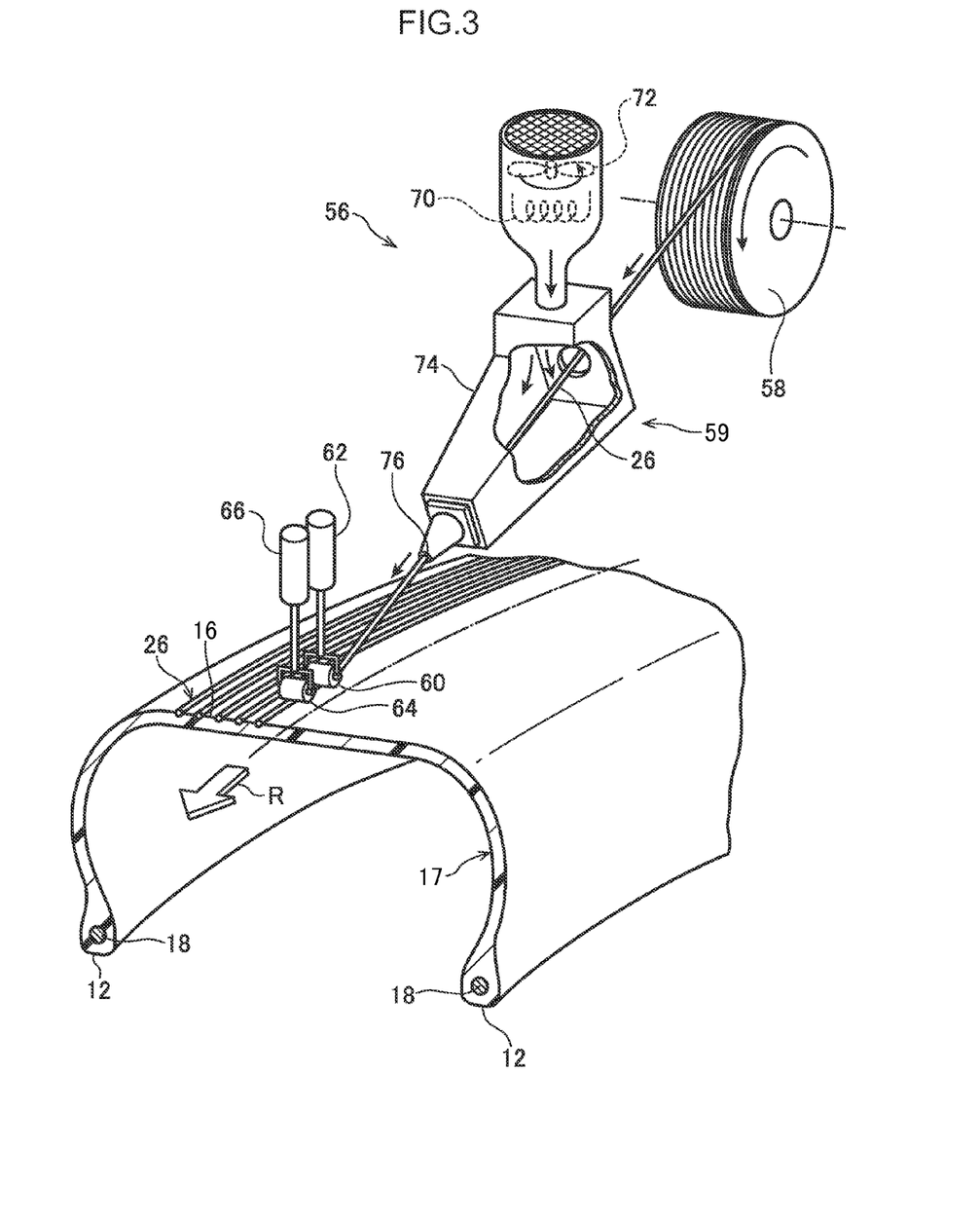
FIG. 3 is an explanatory diagram to explain an operation that embeds a reinforcing cord in a crown portion of a tire case using a cord heating device and rollers.

Explanation next follows regarding a reinforcing cord winding process, with reference to FIG. 3. FIG. 3 is an explanatory diagram to explain an operation to embed the reinforcing cord in the crown portion of a tire case using a cord heating device and rollers. In FIG. 3, a cord supply device 56 is equipped with: a reel 58 wound with reinforcing cord 26; a cord heating device 59 disposed at the cord conveying direction downstream side of the reel 58; a first roller 60 disposed at the reinforcing cord 26 conveying direction downstream side; a first cylinder device 62 to move the first roller 60 in a direction towards, or away from, the tire outer peripheral face; a second roller 64 disposed at the reinforcing cord 26 conveying direction downstream side of the first roller 60; and a second cylinder device 66 to move the second roller 64 in a direction towards, or away from, the tire outer peripheral face. The second roller 64 may be a cooling roller made of metal. In the present embodiment, the surface of the first roller 60 or the second roller 64 is coated with a fluororesin (TEFLON (registered trademark) in the present embodiment) to suppress adhering of the melted or softened resin material. In the present embodiment, the cord supply device 56 is configured with the two rollers, the first roller 60 and the second roller 64; however, the invention is not limited to such a configuration, and may be configured with one of the rollers alone (namely, a single roller).

The cord heating device 59 is equipped with a heater 70 and a fan 72 for generating hot air. The cord heating device 59 is also equipped with a heating box 74 that is supplied inside with hot air in an interior space through which the reinforcing cord 26 passes, and a discharge outlet 76 that dispenses the heated reinforcing cord 26.

In the present process, first, the temperature of the heater 70 is raised in the cord heating device 59, and the surrounding air heated by the heater 70 is formed into an airflow by rotation of the fan 72 and delivered into the heating box 74. The reinforcing cord 26 unwound from the reel 58 is then fed into the heating box 74, of which the internal space has been heated by the hot airflow, and heated (for example, the temperature of the reinforcing cord 26 is heated to approximately 100° C. to 200° C.). The heated reinforcing cord 26 passes through the discharge outlet 76, and is wound under a constant tension in a spiral shape on the outer peripheral face of the crown portion 16 of the tire case 17 rotating in the arrow R direction in FIG. 3. When the heated reinforcing cord 26 contacts the outer peripheral face of the crown portion 16, the resin material of the contact portion melts or softens, and at least a portion of the heated reinforcing cord 26 is embedded in the outer peripheral face of the crown portion 16. When this is performed, due to the heated reinforcing cord 26 being embedded in the melted or softened resin material, a state is achieved in which there are no gaps between the resin material and the reinforcing cord 26, namely a close contact state. Air is thereby suppressed from being incorporated into the portion where the reinforcing cord 26 is embedded. Heating the reinforcing cord 26 to a higher temperature than the melting point (or softening point) of the resin material forming the tire case 17 promotes melting or softening of the resin material at the portion contacted by the reinforcing cord 26. This thereby enables the reinforcing cord 26 to be readily embedded in the outer peripheral face of the crown portion 16, and enables the incorporation of air to be effectively suppressed.

The embedded amount L of the reinforcing cord 26 may be adjusted using the heating temperature of the reinforcing cord 26, the tension acting on the reinforcing cord 26, the pressure of the first roller 60, and the like. In the present embodiment, the embedded amount L of the reinforcing cord 26 is set to be ⅕ of the diameter D of the reinforcing cord 26 or greater. The embedded amount L of the reinforcing cord 26 more preferably exceeds ½ the diameter D of the reinforcing cord 26, and most preferably the whole of the reinforcing cord 26 is embedded.

By winding the heated reinforcing cord 26 while embedding in the outer peripheral face of the crown portion 16, the reinforcing cord layer 28 is formed at the outer peripheral side of the crown portion 16 of the tire case 17.

A single turn of the vulcanized, belt shaped, crown 30 is then wound around the outer peripheral face of the tire case 17, and the crown 30 is bonded to the outer peripheral face of the tire case 17, with a bonding agent or the like. Note that the crown 30 may, for example, be a pre-cured crown to be employed in conventional known retread tires. The present process is similar to the process for bonding a pre-cured crown to the outer peripheral face of a base tire of a retread tire.

Bonding the seal layers 24, formed of a vulcanized rubber, to the bead portions 12 of the tire case 17 with a bonding agent or the like thereby completes the tire 10.

Effects

In the tire 10 of the present embodiment, due to the tire case 17 being formed of a resin material including a resin composition in which the thermoplastic resin of the invention and the elastomer component of the invention have been dynamically crosslinked, excellent low loss property can be achieved in addition to excellent high temperature permanent deformation properties and high elastic modulus. The structure of the tire 10 is simpler than that of a conventional rubber-made tire, and so a reduction in weight is achieved. The tire 10 of the present embodiment accordingly has high abrasion resistance and durability. The tire case 17 is moreover capable of being injection molded, and so has exceptionally good productivity.

In the tire 10 of the present embodiment, the puncture resistance performance, cut resistance performance, and the circumferential direction rigidity of the tire 10 is improved due to winding the reinforcing cord 26 with higher rigidity than the resin material onto the outer peripheral face of the crown portion 16 of the tire case 17 formed of the resin material, in a spiral shape along the circumferential direction. Raising the circumferential direction rigidity of the tire 10 prevents creep of the tire case 17 formed of the resin material.

Due to at least a portion of the reinforcing cord 26 being embedded in and in close contact with the resin material at the outer peripheral face of the crown portion 16 of the tire case 17 formed of the resin material in a cross-section taken along the axial direction of the tire case 17 (the cross-section illustrated in FIG. 1), air is suppressed from being incorporated during manufacture, and the reinforcing cord 26 is suppressed from moving under input during running, or the like. Delamination and the like of the reinforcing cord 26, the tire case 17, or the crown 30 is thereby suppressed from occurring, improving the durability of the tire 10.

Since the reinforcing cord layer 28 thus formed including a resin material enables the difference in hardness between the tire case 17 and the reinforcing cord layer 28 to be reduced, compared to cases in which the reinforcing cord 26 is fixed with cushion rubber, the reinforcing cord 26 can be placed in closer contact with and better fixed to the tire case 17. This thereby enables the incorporation of air described above to be effectively prevented, enabling movement of the reinforcing cord member during running to be effectively suppressed.

Moreover, cases in which the reinforcing cord 26 is configured by steel cord enable easy separation and recovery from the resin material by heating the reinforcing cord 26 when disposing of the tire, with this being advantageous from the perspective of recycling properties of the tire 10. The loss coefficient (tan δ) of resin material is also lower than that of vulcanized rubber, enabling the tire rolling property to be improved when the reinforcing cord layer 28 includes a lot of resin material. Moreover, the in-plane shear stiffness of resin material is larger than that of vulcanized rubber, with the advantages of excellent steering stability during tire running and abrasion resistance.

As illustrated in FIG. 2, the embedded amount L of the reinforcing cord 26 is ⅕ of the diameter D or greater, and so the incorporation of air during manufacture is effectively suppressed, further suppressing the reinforcing cord 26 from moving under input of force or the like during running.

The crown 30 that contacts the road surface is configured from a rubber material that has greater abrasion resistance than the resin material forming the tire case 17, accordingly improving the abrasion resistance of the tire 10.

Moreover, the ring shaped bead cores 18 formed of a metal material are embedded in the bead portions 12, and so similarly to with a conventional rubber-made pneumatic tire, the tire case 17, namely the tire 10, is firmly retained on the rim 20.

Moreover, the seal layer 24, formed of a rubber material with better sealing properties than the resin material forming the tire case 17, is provided at the portions that contact the rim 20 of the bead portions 12, and so the sealing properties between the tire 10 and the rim 20 are improved. The leakage of air from inside the tire is accordingly even further suppressed than in cases in which sealing is made by the rim 20 and the resin material forming the tire case 17 alone. The rim fitting properties are therefore improved by providing the seal layer 24.

The above embodiment is configured by heating the reinforcing cord 26, with the surface of the tire case 17 melting or softening at the portions where the heated reinforcing cord 26 makes contact; however, the invention is not limited to such a configuration, and, without heating the reinforcing cord 26, the reinforcing cord 26 may be embedded in the crown portion 16 after using a hot airflow generation device to heat the outer peripheral face of the crown portion 16 where the reinforcing cord 26 is to be embedded.

In the first embodiment, the heat source of the cord heating device 59 is a heater and a fan; however, the invention is not limited to such a configuration, and configuration may be made to directly heat the reinforcing cord 26 with radiation heat (for example, by infrared radiation).

The first embodiment is configured such that the portion of the resin material melted or softened where the reinforcing cord 26 is embedded is forcibly cooled with the metal second roller 64; however, the invention is not limited to such a configuration, and configuration may be made such that a cooling airflow is blown directly onto the portion of the resin material that is melted or softened, thereby force-cooling and solidifying the melted or softened portion of the resin material.

The first embodiment is configured such that the reinforcing cord 26 is heated; however, for example, configuration may be made such that the outer periphery of the reinforcing cord 26 is covered by a resin material that is the same as that of the tire case 17. In such cases, by heating the reinforcing cord 26 together with the covering resin material when winding covered reinforcing cord onto the crown portion 16 of the tire case 17, air incorporation during embedding in the crown portion 16 can be effectively suppressed.

Winding the reinforcing cord 26 in a spiral shape facilitates manufacture; however, other methods in which reinforcing cord 26 is discontinuous in the width direction may also be considered.

In the tire 10 of the first embodiment, the bead portions 12 are fitted onto the rim 20 so as to form an air chamber between the tire 10 and the rim 20, which is what is referred to as a tubeless tire; however, the invention is not limited to such a configuration, and may be formed into a complete tube shape.

Although embodiments have been explained above as embodiments of the invention, these embodiments are merely examples, and various modifications may be implemented within a range not departing from the spirit. Obviously the scope of rights of the invention is not limited to these embodiments.

EXAMPLES

More specific explanation regarding the invention is given below based on Examples. However the invention is not limited thereto.

Examples 1 to 12

The elastomer components and the crosslinking components listed in the following Table 1 and Table 2 were placed in a BANBURY MIXER, mixed and kneaded for approximately 2 minutes, and discharged at 120° C., and an elastomer component incorporating a crosslinking component was prepared. The prepared elastomer component incorporating a crosslinking component was pelletized using a rubber pelletizer.

The pelletized elastomer components and the resin components listed in Tables 1 and 2 were then dry blended at a specific blending ratio, placed in a twin screw kneader, and dynamically crosslinked to prepare a thermoplastic elastomer composition. The kneading conditions during dynamic crosslinking were a temperature of 270° C., higher than the melting temperature of the resin, and a shear rate of 1000 s$^{-1}$.

The thermoplastic elastomer composition produced by twin screw kneading was next water cooled, and then pelletized. The pellets were then employed to produce each test piece by extrusion molding, and the following compression permanent deformations were measured.

The injection moldability of those Examples and the Comparative Examples capable of producing test pieces by injection molding were evaluated as "A", and the injection moldability of those not capable of producing test pieces by injection molding were evaluated as "C".

Comparative Example 1

A BANBURY MIXER was employed, and the elastomer components listed in Table 2 were kneaded for 3 minutes. The kneading temperature at this stage (the first stage kneading temperature) was 120° C. The crosslinking components listed in the following Table 2 were then introduced, mixed at 80° C. for 1 minute, and then a rubber material of Comparative Example 1 was manufactured by performing press-vulcanization at 160° C. for 15 minutes. The obtained material was an ordinary blended rubber incapable of exhibiting injection moldability.

Comparative Example 2

After performing kneading and vulcanization under the same conditions as in Comparative Example 1, the obtained vulcanized rubber was pulverized in a pulverizer, and pulverized vulcanized rubber was obtained with an average particle size of 250 μm. The rubber and the resin components listed in Table 2 were then dry blended at a specific blending ratio, placed in a twin screw kneader, and a thermoplastic elastomer composition was prepared. The produced thermoplastic elastomer composition was then water cooled, and then pelletized. The thermoplastic elastomer composition of the Comparative Example 2 included the resin component of the invention and the elastomer component of the invention; however, the molten viscosity was high, and injection molding was not possible. Test pieces were accordingly produced by press molding.

Compression Permanent Deformation

Test pieces with a diameter of 13 mm and a thickness of 6 mm were employed as specified in JIS K6262-2006, compressed for 22 hours at a compression of 25% at 100° C., and the compression permanent deformation was measured. The values of each of the examples are as shown in the following Table 1, taking the value of the Comparative Example 2 as 100. For these numerical values, the larger the value, the better the compression permanent deformation property at high temperature.

Rolling Resistance Values (Evaluation of Low Loss Property)

A viscoelasticity analyzer (manufactured by Rheometric Scientific Inc.) was employed, and tan δ (50° C.) was measured at a temperature of 50° C., strain of 3%, and frequency of 15 Hz. The lower tan δ (50° C.), the better the low loss property.

Evaluation of Tensile Elastic Modulus

The pellets prepared in the examples and comparative examples were employed, and injection molding was performed employing an SE30D, manufactured by Sumitomo Heavy Industries Co., Ltd., with a molding temperature of from 180° C. to 260° C., and with a mold temperature of from 50° C. to 70° C., and samples of 100 mm×30 mm and thickness of 2.0 mm were obtained. A test piece was prepared by press molding in Comparative Example 2.

Each of the test samples was punched, and dumbbell-shaped test samples as defined in JIS K6251:1993 were prepared (Number 5 test samples).

Then a Shimadzu Autograph AGS-J (5KN), manufactured by Shimadzu Corporation, was employed, and the tensile elastic modulus at 80° C. of each of the dumbbell shaped test samples was measured with elongation speed set at 200 mm/min. The results are shown in Tables 1 and 2

Example 13 to Example 19 and Comparative Example 3

Similarly to Example 1, dynamically crosslinked thermoplastic elastomer compositions, according to Table 3 below, were prepared, and similar evaluation was performed.

TABLE 1

|  |  | Example 1 | Example 2 | Example 3 | Example 4 | Example 5 | Example 6 | Example 7 |
|---|---|---|---|---|---|---|---|---|
| Elastomer Components | ESBR | 50 | — | — | — | — | — | — |
|  | Carboxy group-containing SBR | — | 50 | — | — | — | — | — |
|  | BR | — | — | — | 20 | — | — | — |
|  | NR | — | — | — | — | 50 | — | — |
|  | IR | 50 | 50 | — | 80 | 50 | 20 | — |
|  | EPDM | — | — | 50 | — | — | 80 | 50 |
|  | TAFMER MP0610 | — | — | 50 | — | — | — | 50 |
|  | PU | — | — | — | — | — | — | — |
|  | EVA | — | — | — | — | — | — | — |
| Additives | Anti-aging Agent 6PPD | 1 | 1 | 1 | 1 | 1 | 1 | 1 |
|  | Anti-aging Agent A | 1 | 1 | 1 | 1 | 1 | 1 | 1 |
|  | Crosslinking Agent |  |  | 2.5 |  |  | 2.5 | 2.5 |

TABLE 1-continued

|  |  | Example 1 | Example 2 | Example 3 | Example 4 | Example 5 | Example 6 | Example 7 |
|---|---|---|---|---|---|---|---|---|
|  | Stearic Acid | 1 | 0.5 | 0.5 | 2 | 2 | 2 | 2 |
|  | Flowers of Zinc | 3 | 3 | 3 | 3 | 3 | 3 | 3 |
|  | C/B | 65 | 65 | 65 | 50 | 50 | 50 | 50 |
|  | Sulfur | 1.5 | 1.5 | — | 1.5 | 1.5 | — | — |
|  | Vulcanization Accelerating Agent DPG | 1 | 1 | — | 1 | 1 | — | — |
|  | Vulcanization Accelerating Agent DM | 1 | 1 | — | 1 | 1 | — | — |
|  | Vulcanization Accelerating Agent CZ | 1 | 1 | — | 1 | 1 | — | — |
| Resins | Nylon 6 | 171 | 171 | 57 | — | — | — | — |
|  | Nylon 12 | — | — | — | 255 | 255 | 255 | 255 |
|  | Polyester | — | — | — | — | — | — | — |
|  | BM-4 | 29 | 29 | 10 | 43 | 43 | 43 | 43 |
| Evaluated Items | Injection Moldability | A | A | A | A | A | A | A |
|  | Compression Permanent Deformation | 108 | 115 | 100 | 102 | 105 | 106 | 110 |
|  | Elastic Modulus (MPa) | 102 | 103 | 98 | 104 | 103 | 112 | 126 |
|  | Low Loss Property | 92 | 101 | 104 | 102 | 102 | 108 | 110 |

TABLE 2

|  |  | Example 8 | Example 9 | Example 10 | Example 11 | Example 12 | Comparative Example 1 | Comparative Example 2 |
|---|---|---|---|---|---|---|---|---|
| Elastomer components | ESBR | — | — | — | — | — | — | 50 |
|  | Carboxy group-containing SBR | — | — | 50 | — | — | — | — |
|  | BR | — | — | — | — | — | 20 | — |
|  | NR | — | — | — | — | — | 80 | — |
|  | IR | — | — | 50 | — | — | — | 50 |
|  | EPDM | — | — | — | 50 | 100 | — | — |
|  | TAFMER MP0610 | — | — | — | 50 | — | — | — |
|  | PU | 100 | — | — | — | — | — | — |
|  | EVA | — | 100 | — | — | — | — | — |
| Additives | Anti-aging Agent 6PPD | 1 | 1 | 1 | 1 | 1 | 1 | 1 |
|  | Anti-aging Agent A | 1 | 1 | 1 | 1 | 1 | — | 1 |
|  | Crosslinking Agent | — | 2.5 | — | 2.5 | 2.5 | — | — |
|  | Stearic Acid | 2 | 2 | 2 | 2 | 2 | 2 | 2 |
|  | Flowers of Zinc | 3 | 3 | 3 | 3 | 3 | 3 | 3 |
|  | C/B | 50 | 50 | 50 | 50 | 50 | 65 | 65 |
|  | Sulfur | 1.5 | — | 1.5 | — | — | 1.5 | 1.5 |
|  | Vulcanization Accelerating Agent DPG | 1 | — | 1 | — | — | 1 | 1 |
|  | Vulcanization Accelerating Agent DM | 1 | — | 1 | — | — | 1 | 1 |
|  | Vulcanization Accelerating Agent CZ | 1 | — | 1 | — | — | 1 | 1 |
| Resins | Nylon 6 | — | — | — | — | 420 | — | 36 |
|  | Nylon 12 | 286 | 286 | — | — | — | — | — |
|  | Polyester | — | — | 400 | 400 | — | — | — |
|  | BM-4 | 48 | 48 | 67 | 67 | 70 | — | 6 |

TABLE 2-continued

|  |  | Example 8 | Example 9 | Example 10 | Example 11 | Example 12 | Comparative Example 1 | Comparative Example 2 |
|---|---|---|---|---|---|---|---|---|
| Evaluated Items | Injection Moldability | A | A | A | A | A | C | C |
|  | Compression Permanent Deformation | 98 | 108 | 101 | 95 | 78 | — | 100 |
|  | Elastic Modulus (MPa) | 118 | 118 | 112 | 108 | 125 | — | 100 |
|  | Low Loss Property | 108 | 108 | 106 | 106 | 100 | — | 100 |

TABLE 3

|  |  | Example 13 | Example 14 | Example 15 | Example 16 | Example 17 | Example 18 | Example 19 | Comparative Example 3 |
|---|---|---|---|---|---|---|---|---|---|
| Elastomer components | ESBR | 50 | — | — | 50 | 50 | 50 | 50 | 50 |
|  | Carboxy group-containing SBR | — | — | — | — | — | — | — | — |
|  | BR | — | — | — | — | — | — | — | — |
|  | NR | — | — | — | — | — | — | — | — |
|  | IR | 50 | — | — | 50 | 50 | 50 | 50 | — |
|  | IIR | — | — | — | — | — | — | — | 50 |
|  | EPDM | — | 50 | — | — | — | — | — | — |
|  | Modified EPDM | — | — | 50 | — | — | — | — | — |
|  | TAFMER MP0610 | — | 50 | 50 | — | — | — | — | — |
|  | PU | — | — | — | — | — | — | — | — |
|  | EVA | — | — | — | — | — | — | — | — |
| Additives | Anti-aging Agent 6PPD | 1 | 1 | 1 | 1 | 1 | 1 | 1 | 1 |
|  | Anti-aging Agent A | 1 | 1 | 1 | 1 | 1 | 1 | 1 | 1 |
|  | Crosslinking Agent | — | — | — | — | — | — | — | — |
|  | Stearic Acid | 1 | 0.5 | 0.5 | 2 | 2 | 2 | 1 | 1 |
|  | Flowers of Zinc | 3 | 3 | 3 | 3 | 3 | 3 | 3 | 3 |
|  | C/B | 65 | 65 | 65 | 65 | 65 | 65 | 65 | 65 |
|  | Sulfur | 1.5 | 0.5 | 0.5 | 1.5 | 1.5 | 1.5 | 1.5 | 1.5 |
|  | Vulcanization Accelerating Agent DPG | 1 | 0.3 | 0.3 | 1 | 1 | 1 | 1 | 1 |
|  | Vulcanization Accelerating Agent DM | 1 | 0.3 | 0.3 | 1 | 1 | 1 | 1 | 1 |
|  | Vulcanization Accelerating Agent CZ | 1 | 0.3 | 0.3 | 1 | 1 | 1 | 1 | 1 |
| Resins | Nylon 6 | — | — | 57 | 40 | 500 | 510 | 100 | 171 |
|  | Nylon 12 | — | — | — | — | — | — | — | — |
|  | Polyester | — | — | — | — | — | — | 71 | — |
|  | Polyolefin-based Resin | 171 | 57 | — | — | — | — | — | — |
|  | BM-4 | 29 | 10 | 10 | 6 | 6 | 6 | 29 | 29 |
| Evaluation Items | Injection Moldability | A | A | A | B | A | A | A | A |
|  | Compression Permanent Deformation | 106 | 112 | 105 | 101 | 97 | 88 | 107 | 100 |
|  | Elastic Modulus (MPa) | 102 | 92 | 99 | 102 | 129 | 135 | 101 | 102 |
|  | Low Loss Property | 96 | 93 | 97 | 98 | 108 | 120 | 93 | 100 |

The meanings of the abbreviations used in the tables are given below. Note that the numeric value indicated for each component in the tables refers to parts by mass.

ESBR: emulsion polymerized SBR, manufactured by JSR Corporation (product name #1500)

Carboxyl group-containing SBR (preparation method as follows)

Preparation Method

First, an 800 mL pressure resistance glass vessel was dried and purged with nitrogen, and a solution of 1,3-butadiene in cyclohexane and a solution of styrene in cyclohexane were added to the vessel so as to give 60 g of 1,3-butadiene and 15 g of styrene. Next, 0.36 mmol of 2,2-ditetrahydrofuryl-propane was added, and 0.72 mmol of n-butyl lithium (BuLi) was added, and then a polymerization reaction was performed for 1.5 hours in a 50° C. water bath. The polymerization conversion ratio was approximately 100%. Next, 0.65 mmol of maleic acid anhydride was added to the polymerization reaction system, and acid modification was performed for a further 30 minutes at 50° C. Then 0.5 ml of a 5% by mass solution of 2,6-di-t-butyl-p-cresol in isopropanol was then added to terminate the polymerization reaction, and drying was performed according to an ordinary method to obtain a maleic acid modified polymer (carboxyl group-containing SBR).

BR: butadiene rubber, manufactured by JSR Corporation (product name: BR01)

NR: natural rubber

IR: isoprene rubber, manufactured by JSR Corporation (product name: IR2200)

IIR: butyl rubber, manufactured by JSR Corporation (product name: Bromobutyl 2245)

EPDM: ethylene propylene diene rubber, manufactured by JSR Corporation (product name: EP43)

Modified EPDM (preparation method as follows)
Production of Maleic Acid Modified EPDM 5 mol equivalent of maleic acid anhydride and 0.1 parts by mass of dicumylperoxide, with respect to EPDM (manufactured by JSR Corporation, product name: EP-22), were mixed with the EPDM and kneaded, heat treatment was performed at from 160° C. to 180° C., and maleic acid modified EPDM was obtained.

TAFMER MP-0610 (manufactured by Mitsui Petrochemical Industries, Ltd.)

PU: polyurethane, manufactured by BASF Japan Ltd. (product name: Elastollan 1164D)

EVA: manufactured by TOSOH CORPORATION (product name: Ultrasen 633)

Anti-aging agent 6PPD: N-(1,3-dimethylbutyl)-N'-phenyl-p-phenylene diamine (NOCRAC 6C, manufactured by Ouchi Shinko Chemical Industrial Co., Ltd.)

Anti-aging agent A: manufactured by BASF Japan Ltd. (product name: Irganox 1098)

Crosslinking agent: dicumyl peroxide (DCP), manufactured by NOF CORPORATION (product name: Percumyl D-40)

Flowers of zinc: zinc oxide

C/B: carbon black, manufactured by Asahi Carbon Co., Ltd. (product name: #80)

Vulcanization accelerator DPG: manufactured by Ouchi Shinko Chemical Industrial Co., Ltd. (product name "NOCCELER D")

Vulcanization accelerator DM: manufactured by Ouchi Shinko Chemical Industrial Co., Ltd. (product name "NOCCELER DM")

Vulcanization accelerator DM: manufactured by Ouchi Shinko Chemical Industrial Co., Ltd. (product name "NOCCELER CZ")

Nylon 6: manufactured by Ube Industries, Ltd. (product name: 1022B)

Nylon 12: manufactured by Ube Industries, Ltd. (product name: 3020U)

Polyester: manufactured by WinTech Polymer Ltd. (product name: DURANEX 2002)

Polyolefin-based resin: manufactured by Prime Polymer Co., Ltd. (product name: J-700GP)

BM-4: manufactured by Daihachi Chemical Industry Co., Ltd., n-butylbenzene sulfonamide As is apparent from Tables 1 to 3, the dynamically crosslinked resin compositions of the Examples have excellent compression permanent deformations at high temperature, elastic moduli, and low loss property. Moreover, all of the Examples had excellent injection moldability. However, even though a resin component was employed in the Comparative Example 2, the molten viscosity was high, and the injection moldability was inferior. Similarly, a rubber component was employed alone in the Comparative Example 1, and injection molding was not possible.

The disclosure of Japanese Patent Application No. 2013-039750 is incorporated in the present specification by reference.

The invention claimed is:

1. A tire, comprising: a circular tire frame comprising a bead portion and a crown portion; and a reinforcing cord that is wound in a spiral shape such that at least a portion of the reinforcing cord is embedded in the crown portion of the circular tire frame,
   the circular tire frame comprising the bead portion and the crown portion being formed by injection molding of a resin material, the resin material comprising a resin composition in which at least one thermoplastic resin and at least one elastomer have been dynamically crosslinked in the presence of a crosslinking agent, and the resin composition comprising from 40 parts by mass to 500 parts by mass of the at least one thermoplastic resin with respect to 100 parts by mass of the at least one elastomer, and
   the circular tire frame comprising the bead portion and the crown portion consisting of the injection-molded resin material;
   wherein the at least one thermoplastic resin is selected from the group consisting of a polyamide-based thermoplastic resin, a polyester-based thermoplastic resin, and a polyolefin-based thermoplastic resin;
   wherein the at least one elastomer is selected from the group consisting of a diene-based rubber, a vinyl acetate copolymer, a polyurethane, an ethylene propylene rubber, and any mixture thereof;
   wherein a bead core is embedded in and surrounded by the bead portion of the circular tire frame; and
   wherein the bead core is in direct contact with the injection-molded resin material of the bead portion of the circular tire frame.

2. The tire of claim 1, wherein the thermoplastic resin is a polyamide-based thermoplastic resin.

3. The tire of claim 1, wherein the at least one elastomer is selected from the group consisting of a diene-based rubber, an ethylene propylene rubber, and any mixture thereof.

4. The tire of claim 1, wherein the elastomer is an ethylene propylene rubber, or a modified product thereof.

5. The tire of claim 4, wherein the ethylene propylene rubber is a rubbery copolymer of ethylene, propylene and a diene compound, or a rubbery copolymer of ethylene and propylene.

6. The tire of claim 4, wherein the ethylene propylene rubber is a maleic acid-modified ethylene propylene rubber.

* * * * *